United States Patent [19]
Ferrin et al.

[11] 4,013,171
[45] Mar. 22, 1977

[54] CARD SELECTOR

[75] Inventors: Albert William Ferrin, Defiance, Mo.; John G. Callos, Youngstown, Ohio

[73] Assignee: A. W. Ferrin, Beatrice Ferrin, Donald H. Stephen, Trustees of the Lectrojog Company, Defiance, Mo.

[22] Filed: Jan. 2, 1976

[21] Appl. No.: 646,396

[52] U.S. Cl. .............................................. 209/80.5
[51] Int. Cl.² ........................................ B07C 5/12
[58] Field of Search ...................... 209/80.5, 110.5

[56] References Cited

UNITED STATES PATENTS

| 2,417,531 | 3/1947 | Welk | 209/110.5 |
| 2,665,694 | 1/1954 | Movers et al. | 209/110.5 |
| 3,247,854 | 4/1966 | Garfield | 209/110.5 |

FOREIGN PATENTS OR APPLICATIONS

| 715,287 | 9/1954 | United Kingdom | 209/110.5 |

Primary Examiner—Allen N. Knowles
Attorney, Agent, or Firm—Ralph W. Kalish

[57] ABSTRACT

A card selector which comprises a cradle for receiving an assemblage of cards and with a mechanism for effecting vibratory movement of said cradle. The cards useful with said machine are provided with information receiving zones and with there being marginal perforations corresponding to such zones; those perforations relating to said zones having data entered therein opening through the adjacent edge of the card by means of a recess. Rigid elongated members are provided for extension through the aligned perforations along one margin of the cards in an assemblage thereof for suspendingly supporting same within said cradle whereby upon vibration of said cradle cards having the engaged perforations opening through the adjacent margin separate from the assemblage by freely dropping into the lower portion of said cradle.

3 Claims, 4 Drawing Figures

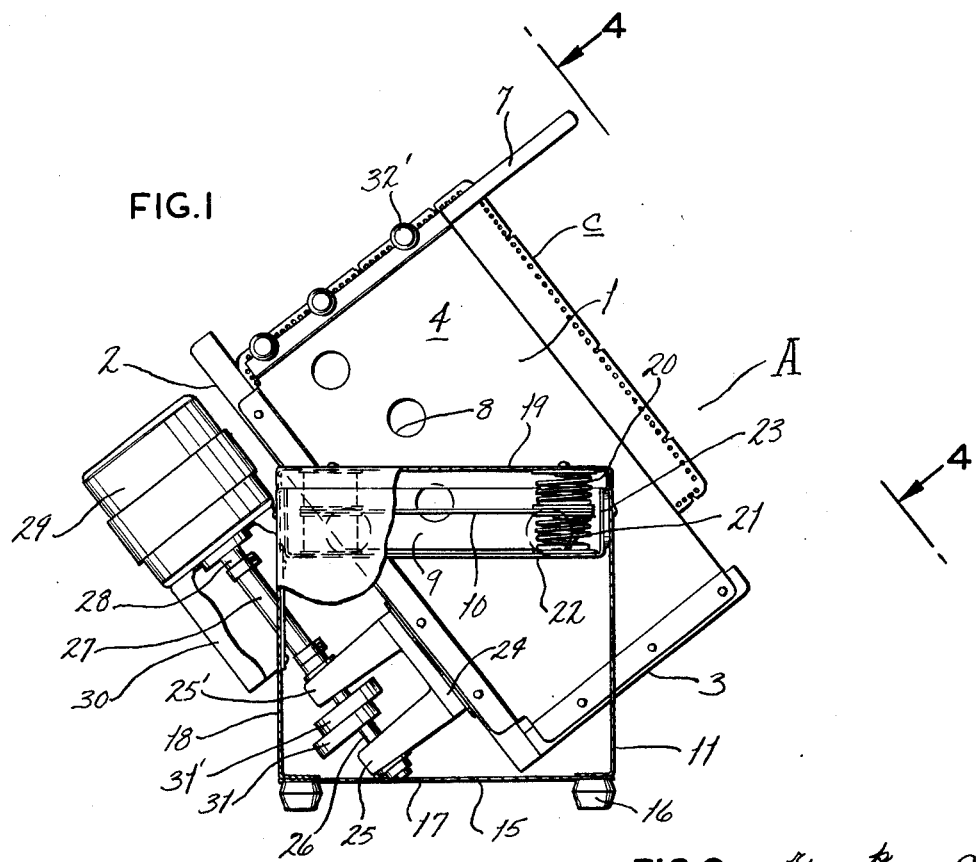
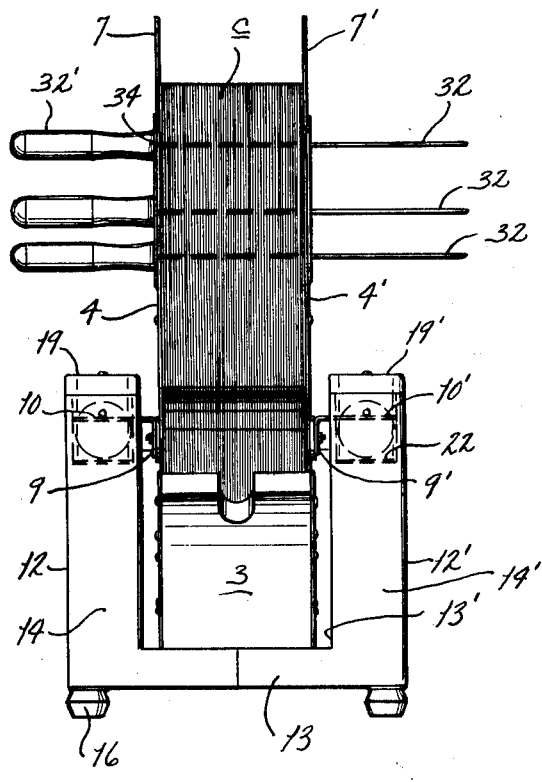
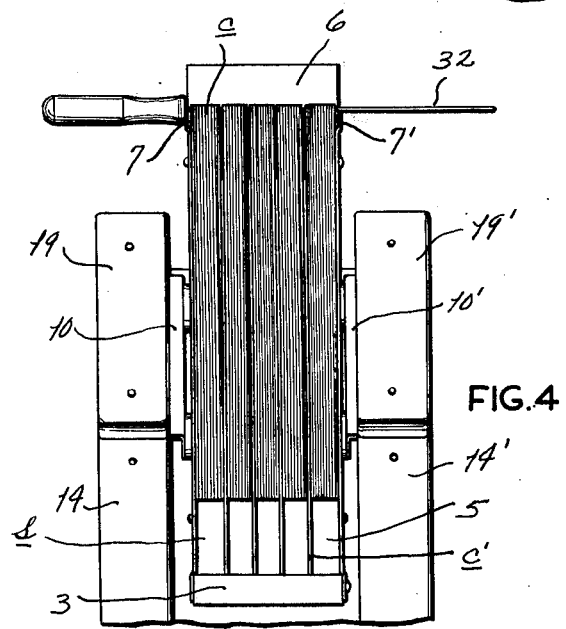
FIG. 1
FIG. 2
FIG. 3
FIG. 4

CARD SELECTOR

BACKGROUND AND SUMMARY OF THE INVENTION

This invention relates in general to information retrieval and, more particularly, to a machine for automatically separating a card or cards from an assemblage thereof which have the particular informational data thereon corresponding to that sought.

Heretofore, there have been numerous efforts undertaken to effect retrieval of information stored upon individual cards which are retained within groups, collections, or the like; such information being of an infinite variety of subject matters. However, cards of this type are especially suited for utilization in recording the capabilities of an individual for consideration of qualifications for a particular occupation or employment. Such efforts have comprehended complex systems involving computers, as well as various types of sorters and the utilization of key-sort cards. All of the current expedients have been deficient in versatility since such have proved to have special specific applications rather than the desired versatility. The expense of operation of computers has limited the utilization of the same to relatively large firms; while sorters have proved cumbersome and time-consuming and, thus, uneconomical since a plurality of such sorters must necessarily be utilized and with several cards being required for each discrete subject, such as an individual. An attempt to overcome the deficiencies of the key-sorter retrieval system was effected by using cards of substantially relatively increased area but such larger cards did not obviate the need for a plurality of sorting operations and, hence, still requiring considerable time consumption.

Therefore, it is an object of the present invention to provide a machine for effecting the separation of a card or cards from an assemblage thereof; which have predetermined information thereon and with the separation being effected in a most rapid manner.

It is another object of the present invention to provide a machine of the character stated which does not require any specialized skills on the part of the operator, but may be easily and effectively operated by general office personnel.

It is a still further object of the present invention to provide a machine of the character stated which embodies a mechanism for paper jogging so that the said machine may be utilized for either jogging or selecting usage.

It is another object of the present invention to provide a card selector of the character stated which is particularly suitable for utilization with cards having marginal perforations corresponding to informational zones inscribed or otherwise provided upon the card and with the perforations relating to entered data being open to the adjacent margin of the card for facile displacement from a card assemblage support member responsive to vibratory action.

It is another object of the present invention to provide a card selector of the character stated which may be most economically produced; which operates in a highly rapid and efficient manner at minimal cost; which may be developed by usage of a paper jogging machine without necessitating structural modifications thereof; and which is durable in usage.

BRIEF DESCRIPTION OF THE DRAWINGS

FIG. 1 is a side elevational view, partially broken away, of a card selector constructed in accordance with and embodying the present invention, illustrating the same in operative position with a batch of cards disposed therein.

FIG. 2 is a fragmentary plan view of an edge portion of a card of the type to be separated by the machine of the present invention.

FIG. 3 is a front view taken on the right hand side of FIG. 1.

FIG. 4 is a front view taken on the line 4—4 of FIG. 1 illustrating cards separated by operation of the machine.

DESCRIPTION OF THE PREFERRED EMBODIMENT

Referring now by reference numerals to the drawings which illustrate the preferred embodiment of the present invention, A generally indicates a card selector which is fundamentally structurally of the same general character as paper jogging machines, such as set forth in U.S. Pat. Nos. 2,624,557 and 2,883,197. Machine A thus incorporates a cradle 1 adapted to receive, as will be shown more fully hereinbelow, a group or batch of cards $c$ having related intelligence provided thereon, such as applicant qualifications of a particular occupational class, from which group certain cards $c'$ bearing predetermined, specific data will be separated through imparting of vibratory action to cradle 1. The means for effecting vibration of cradle 1 do not form a part of the present invention since, as evidenced by the aforesaid patents, such action may be achieved by a marked variety of well known mechanisms.

Cradle 1 comprises an inclined bottom or rear wall 2, an inclined end wall 3 perpendicular to bottom wall 2, and with there being parallel side walls 4,4', with cradle 1 being open toward its forward or top, as at 5, and at its upper end as at 6. For purposes presently appearing, side walls 4,4' at their upper ends may be provided with parallel elongated arms 7,7', the upper edges of which are flush with the upper edges of walls 4,4', and which extend any preselected distance forwardly beyond said side walls 4,4'. Each of the various walls of cradle 1 may be provided with apertures, as indicated at 8 in side wall 4 for purposes of illustration only, which permit of ejection of any dust or like foreign particles from cards $c$ during operation whereby machine A also brings about a self-cleaning action upon the work.

As will be developed more fully below, the distance between the upper surface of inclined end wall 3, and the upper edge of side walls 4,4' or arms 7,7', is of greater extent than the height of the accommodated cards $c$ so that when the latter are in suspended condition, by means described below, a spacing $s$ will intervene the bottom edge of cards $c$ and end wall 3 for receiving the separated cards $c'$. The width of side walls 4,4' is a matter of option since the same merely serve to give lateral support to the group of cards $c$ and thus with a width less than that of said cards $c$, the criticality of arms 7,7' as shown in FIG. 1 is apparent as the same serve to adapt cradle 1 for handling cards of varying width and thereby enhancing the versatility of machine A.

Mounted on the opposite outer faces of side walls 4,4' are parallel aligned, elongated angle members 9,9', respectively, one flange 10,10', respectively, of which projects laterally outwardly within a horizontal plane; the said bottom wall 2 being at an angle to the said horizontal plane, as is evident from FIGS. 1 and 3.

Cradle 1 is suspended within a casing 11 having parallel side walls 12,12', a front wall 13 which is cut away, as at 13', for projection therethrough of the lower, upper end of cradle 1; with the development of front wall side portions 14,14'; and with there being a base wall 15 having supporting feet 16 at each of its corners, but being open throughout the major portion of its area, as at 17, to allow for uninhibited movement of cradle 1 during operation. A rear wall 18 interconnects side walls 12, 12' and is also cut away throughout its upper central portion, (not shown), for clearance of cradle 1 and its associated drive means to be described hereinbelow. Top closures 19,19' are provided at the upper end of each side wall 12,12', respectively, and having a width consonant with front side portions 14,14', respectively. Said flanges 10,10' extend into the adjacent portion of casing 11 with their outer edges terminating inwardly of the inner face of the adjacent side wall 12,12'; said flanges 10,10' being planarwise parallel to the upper surfaces of top closures 19,19', respectively, and disposed a relatively short distance therebelow.

Bearing against the upper face of each flange 10,10' are the lower ends of spaced apart coil springs 20 which abut at their upper ends against the under-face of approximate closure 19,19', as the case may be. Axially aligned with each spring 20 is a companion coil spring 21 of relatively increased strength bearing at its upper end against the under-face of the related flange 10,10' and at its lower end against the upper face of a downwardly spaced plate 22 fixedly secured within casing 11, as by means of flanges 23 riveted to adjacent portions of casing 11. Each side of cradle 1 is thus suspended by two sets of superposed springs 20,21; which sets are located in spaced relationship to each other so as to be at opposite ends of the associated flange 10,10'. From the foregoing it will be seen that cradle 1 is resiliently suspended by said sets of springs 20,21 for absorbing and resisting the vibratory action transmitted to cradle 1 by means to be described, and thus urging return of the same to rest position.

Mounted upon the under, or rearward face of bottom wall 2, in its lower portion, is a plate 24 carried in spaced-apart bearing blocks 25,25' for journalling of a shaft 26 extending therebetween, which latter at its upper end, beyond bearing block 25', is secured to the lower end of a torque tube 27 which tube 27 at its opposite or upper end is clamped or otherwise engaged to the drive shaft 28 of an electric motor 29. Motor 29 is mounted fixedly upon an extension 30 of casing 11. Turning upon shaft 26, between bearings 25,25', is a pair of eccentric weights 31,31' which may be mutually adjusted to alter the angle therebetween for controlling the force of the vibratory motion developed upon rotation of shaft 26. Motor 29 is suitably connected to a convenient source of electrical power as by means of a cord (not shown) and with there being a control switch, as of the toggle type (not shown) presented at a readily accessible location on casing 11.

Upon energization of motor 29, shaft 26 will be caused to rotate and by reason of the eccentricity of weights 31,31' together with the flexibility of torque tube 27, a vibratory motion will be imparted to cradle 1.

Thus, the structure of machine A as described is basically of that of a paper jogging machine whereby collections of papers, cards, and the like, in being disposed upon a cradle will, after subjection to the provided vibratory action, be moved into fully aligned, registering relationship.

Especially suitable for use with machine A are the cards $c$ which are adapted to contain, within defined zones or boxes inscribed or otherwise provided thereon, informational data concerning a selected subject, such as, for example only, statistics, qualifications and occupational experience, of an individual for job or positional consideration, such as would be utilized in employment counseling operations and the like. The perimeter or marginal portion of each card $c$ is provided with a continuing series of perforations $p$ which coordinate with the informational zones or boxes on the card $c$ whereby, when data is entered into such zones or boxes, the advisor will cut out the portion of card $c$ between the coordinating perforation or perforations $p$ and the adjacent edge of card $c$ to cause a generally $v$-shaped recess $r$ to be created.

Turning now to FIG. 2, it will be seen that the illustrated horizontal edge portion of card $c$ contains two perforations $p$ communicating with such recessrs $r$ and, accordingly, for example only, depending upon the selected code, such will indicate particular qualification factors of the card's subject, such as, age, education, work experience, etc., etc. Each card $c$ is thus tailored by the advisor or interviewer for a specific individual so that depending upon the information provided an arrangement of recesses $r$ will be made which is peculiar to such individual.

Cards $c$ are maintained, normally, in stacks, collections, batches, or the like, which preferably contain broadly related informational matter so that when a particular occupational demand arrises, the group of cards $c$ pertinent thereto would customarily have to be screened or reviewed in some manner in order to determine the card $c'$ which demonstrates the greatest number of the sought for characteristics.

With the present invention, the separation of cards $c'$ of the most appropriate individuals for the particular occupation may be rapidly and easily effected. The operator while holding a batch of aligned cards $c$ in one hand, inserts a rigid, elongated needle-like rod 32 through each of the perforations $p$ in the uppermost margin of cards $c$ which correspond to particular skills, ability, experience, education, or the like which meet the requirements of the particular job opening. It is obvious that along any such margin there may be but two or three perforations $p$ which are critically related to the factors required, but regardless of the number of such, a rod 32 is inserted through each set of aligned perforations $p$ which so relate. Thus, for illustration, the drawings show three such needles 32 in the uppermost margin of cards $c$ as in FIG. 1. Said needlelike rods 32 at one of their ends incorporate handle portions 32' which being relatively diametrally increased cause shoulder formations 34 at their inner ends. The length of rods 32 is substantially greater than the transverse distance between side walls 4,4' whereby the said rods 32 in resting upon the upper edges of the latter are of arms 7,7', as the case may be, serve to suspend cards $c$ within cradle 1, with shoulders 34 abutting against the adjacent side wall 4 or 4', and with the handle remote end of rod 32 projecting substantially beyond the adjacent side wall of casing 11 so that said rods 32 will suitably support cards c during vibration of cradle 1 and retain same against displacement. Furthermore, the general inclination of the longitudinal axis of cradle 1 to the vertical also inhibits rods 32 from accidental displacement.

With cards c thus suspended, motor 29 is energized and by reason of the vibration those cards c' having the rod-engaged perforations p communicating with recesses r will be caused to lose contact with rod 32, and drop therefrom into space s, all as may best be seen in FIG. 4. The separated cards c' are then manually withdrawn, and may be readily reviewed for fully determining the capacity of the related individual.

Machine A is quite compact, being disposable upon a table or other convenient surface and is sufficiently light in weight for ease or transportability by an individual. As pointed out hereinabove, arms 7,7' serve to enhance the versatility of machine A rendering same useful with cards of varying size and thereby obviating the necessity of providing side walls of increased width.

The present invention may, of course, be of any desired size, but it has been found that with a cradle having a transverse extent of about 4 inches, a collection of 500 cards c can be examined in a matter of seconds; while a series of collections of cards c totaling 22,000 have been reviewed in less than 8 minutes. Manifestly, machine A is efficient, but yet extremely simple in operation. As is evident from the foregoing a jogging machine as of the type hereinabove referred to may be converted, as it were, into a card selector by utilization of rods 32 and cards c so that such machine becomes one of dual purpose without any structural modification to the jogging machine.

Having described our invention, what we claim and desire to obtain by Letters Patent is:

1. In combination with data receiving cards having perforations adjacent the marginal portions of such cards and preselected perforations of each card opening through the adjacent margin, a card selector machine comprising a casing, a card assemblage cradle having a rear wall, a lower end wall, and parallel side walls, said cradle being open at the front end and upper end thereof, means resiliently mounting said cradle upon said casing in an attitude wherein its major axis is at an angle of less than 90° to the vertical whereby said rear wall inclines downwardly and forwardly and said lower end wall inclines upwardly and forwardly, means located within said casing and rearwardly of said cradle rear wall effecting vibrational movement of said cradle, the side walls of said cradle being of greater length than that of the data receiving cards, said cradle side walls having opposed edge portions at the ends thereof remote from said lower end wall, said rear wall projecting beyond the opposed edge portions of said cradle side walls, means suspending an assemblage of data receiving cards within said cradle from said cradle side wall opposed side edge portions wherein the upper ends of said cards within such assemblage are mutually aligned and project above said side edge portions, the rearward edges of said cards of said assemblage being restingly supported by said cradle rear wall, said card suspending means being engageable within predetermined aligned perforations in the upper margins of the cards of the received assemblage whereby upon vibration of said cradle cards in which all of the engaged perforations open through the adjacent margin will lose contact with the suspending means and descend toward the lower end of said cradle for retention thereby together with said rear wall for collection pending facile removal.

2. The combination as defined in claim 1 and further characterized by said vibration effecting means comprising a single motor, a shaft engaged to said motor, bearing means engaged to said cradle rear wall, said shaft being journalled in said bearing means, and eccentric weights adjustably carried upon said shaft.

3. The combination as defined in claim 2 and further characterized by said card suspending means comprising elongated rods having a cross section permitting extension of said rods through the perforations in said cards, each of said rods having an enlarged shoulder-forming element on one end thereof for limiting movement of said rods through the card perforations as well as for abutting the adjacent outer face of the confronting side edge portion of said cradle for stabilizing the card assemblage during vibratory movement of said cradle.

* * * * *